(12) United States Patent
Hasegawa et al.

(10) Patent No.: US 10,080,344 B2
(45) Date of Patent: *Sep. 25, 2018

(54) PET PAD AND MANUFACTURING METHOD OF PET PAD

(71) Applicant: UNICHARM CORPORATION, Ehime (JP)

(72) Inventors: Satoshi Hasegawa, Kononji (JP); Yasuhiro Sasano, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/502,477

(22) PCT Filed: Aug. 18, 2014

(86) PCT No.: PCT/JP2014/071577
§ 371 (c)(1),
(2) Date: Feb. 7, 2017

(87) PCT Pub. No.: WO2014/200120
PCT Pub. Date: Dec. 18, 2014

(65) Prior Publication Data
US 2017/0223923 A1    Aug. 10, 2017

(30) Foreign Application Priority Data

Aug. 8, 2014 (JP) .................... 2014-162813

(51) Int. Cl.
*A01K 1/015* (2006.01)
*A01K 1/01* (2006.01)
(Continued)

(52) U.S. Cl.
CPC ............ *A01K 1/0107* (2013.01); *B32B 5/022* (2013.01); *B32B 5/16* (2013.01); *B32B 7/12* (2013.01);
(Continued)

(58) Field of Classification Search
CPC .. A01K 1/0152; A01K 1/0154; A01K 1/0155; A01K 1/0107; B01J 20/3042;
(Continued)

(56) References Cited

U.S. PATENT DOCUMENTS 4,153,505 A * 5/1979 Ferguson ................ B01J 20/22
162/164.6
6,663,949 B1   12/2003 Tanaka et al.
(Continued)

FOREIGN PATENT DOCUMENTS

CN       2868260 Y      2/2007
CN     205623725 U  * 10/2016
(Continued)

OTHER PUBLICATIONS

International Search Report in PCT/JP2014/071577, dated Sep. 9, 2014.
(Continued)

*Primary Examiner* — Yvonne Renee Abbott-Lewis
(74) *Attorney, Agent, or Firm* — Hauptman Ham, LLP

(57) ABSTRACT

Provided are: a sheet for pets which contains carbon and has a superior appearance, and a method of manufacturing the sheet for pets. A sheet for pets is provided with a liquid-permeable front surface sheet, a liquid-impermeable back surface sheet, an absorbent layer that contains carbon and organic acid and is positioned between the front surface sheet and the back surface sheet, and a front surface-side liquid-permeable sheet that is black and is positioned on the front surface sheet-side of the absorbent layer. The front
(Continued)

surface-side liquid-permeable sheet is preferably formed from pulp fibers that have been dyed black.

9 Claims, 6 Drawing Sheets

(51) Int. Cl.
| | |
|---|---|
| B32B 5/02 | (2006.01) |
| B32B 5/16 | (2006.01) |
| B32B 7/12 | (2006.01) |
| B32B 37/10 | (2006.01) |
| B32B 37/12 | (2006.01) |
| B32B 37/24 | (2006.01) |
| B32B 38/00 | (2006.01) |
| B32B 38/06 | (2006.01) |

(52) U.S. Cl.
CPC .............. *B32B 37/10* (2013.01); *B32B 37/12* (2013.01); *B32B 37/24* (2013.01); *B32B 38/0004* (2013.01); *B32B 38/06* (2013.01); *B32B 2264/10* (2013.01); *B32B 2307/726* (2013.01); *B32B 2307/7248* (2013.01); *B32B 2307/7265* (2013.01)

(58) Field of Classification Search
CPC ... B01J 20/12; B01J 20/20; B01J 20/24; B01J 20/28004; B01J 20/28011; B01J 20/28026; B01J 20/2803; B01J 20/28042; B01J 20/3007; B32B 3/04; B32B 5/18
USPC .............. 119/173, 171; 428/68, 71
See application file for complete search history.

(56) References Cited

U.S. PATENT DOCUMENTS

| | | | | |
|---|---|---|---|---|
| 8,101,815 B2* | 1/2012 | Kaneko | ................ | A01K 1/0107 119/169 |
| 8,578,888 B2* | 11/2013 | Komatsubara | ....... | A01K 1/0107 119/171 |
| 8,640,649 B2* | 2/2014 | Matsuo | ................ | A01K 1/0107 119/166 |
| 8,950,360 B2* | 2/2015 | Wang | ................... | A01K 1/0155 119/171 |
| 8,960,127 B2* | 2/2015 | Miller | .................. | A01K 1/0107 119/171 |
| 9,010,273 B2* | 4/2015 | Adamy | ................ | A01K 1/0152 119/171 |
| 2005/0005870 A1* | 1/2005 | Fritter | .................. | A01K 1/0152 119/173 |
| 2007/0017453 A1* | 1/2007 | Fritter | .................. | A01K 1/0152 119/173 |
| 2007/0065625 A1* | 3/2007 | Lai | ....................... | A01K 1/0157 428/71 |
| 2007/0065626 A1* | 3/2007 | Lai | ....................... | A43B 1/0045 428/71 |
| 2007/0107662 A1* | 5/2007 | Queen | ................. | A01K 1/0353 119/28.5 |
| 2009/0084322 A1* | 4/2009 | Axelrod | ............... | A01K 1/0152 119/171 |
| 2014/0298997 A1* | 10/2014 | Lee | .................... | B01J 20/28052 96/154 |
| 2015/0320009 A1 | 11/2015 | Sasano et al. | | |
| 2015/0334985 A1 | 11/2015 | Takahashi et al. | | |

FOREIGN PATENT DOCUMENTS

| | | | |
|---|---|---|---|
| CN | 206136877 U | * | 5/2017 |
| EP | 3081078 A1 | | 10/2016 |
| JP | 2001-104370 A | | 4/2001 |
| JP | 2002-78738 A | | 3/2002 |
| JP | 3548384 B2 | | 7/2004 |
| JP | 3587738 B2 | | 11/2004 |
| JP | 2009-254345 A | | 11/2009 |
| JP | 2010-246905 A | | 11/2010 |
| JP | 2011-55758 A | | 3/2011 |
| JP | 2012-29624 A | | 2/2012 |
| JP | 2012-130285 A | | 7/2012 |
| JP | 2014-117177 A | | 6/2014 |
| JP | 2014-117185 A | | 6/2014 |

OTHER PUBLICATIONS

Office Action in JP Application No. 2014-162813, dated Sep. 2, 2014.
Extended European Search Report in EP Patent Application No. 14811510.8, dated Aug. 22, 2017. 7pp.
International Search Report in PCT Application No. PCT/JP2014/066153, dated Jul. 29, 2014, 4pp.
Office Action in TW Application No. 103142182, dated May 7, 2018, 5pp.

* cited by examiner

PET PAD AND MANUFACTURING METHOD OF PET PAD

RELATED APPLICATIONS

The present application is a National Phase of International Application Number PCT/JP2014/071577, filed Aug. 18, 2014, which claims priority to Japanese Application Number 2014-162813, filed Aug. 8, 2014.

TECHNICAL FIELD

The present invention relates to a pet pad and a manufacturing method of a pet pad.

BACKGROUND ART

Heretofore, a pet pad provided with a liquid-permeable top sheet, a liquid-impermeable back sheet, and a liquid retaining absorbent body disposed between the top sheet and the back sheet has been proposed. Such a pet pad is used mainly for disposal of excrement such as urine and feces of a pet kept indoors (that is, as a toilet). In addition, a pet pad with an absorbent body configured to include charcoal such as activated charcoal to impart an improved deodorizing effect has also been proposed (refer, for example, to Patent Document 1).

Patent Document 1: Japanese Unexamined Patent Application Publication No. 2001-104370

DISCLOSURE OF THE INVENTION

Problems to be Solved by the Invention

However, in the case of the absorbent body of the pet pad including activated charcoal, color of the activated charcoal is visible from the top sheet side and deteriorates the appearance of the pet pad. In other words, in the absorbent body including activated charcoal, black activated charcoal is disposed in a scattered manner among white to whitish colored pulp, which is a major component of the absorbent body. As a result, when the pet pad is seen from the top sheet side, numerous black regions in a spotted pattern caused by the activated charcoal are visually perceived.

Given this, an objective of the present invention is to provide a pet pad that is configured to include charcoal and is superior in appearance and deodorizing property, and a manufacturing method of the pet pad.

Means for Solving the Problems

The present invention relates to a pet pad including: a liquid permeable top sheet; a liquid impermeable back sheet; an absorbent layer containing charcoal and organic acid, the absorbent layer being disposed between the top sheet and the back sheet; and a black top side liquid permeable sheet that is disposed on a top sheet side of the absorbent layer.

It is preferable that the top side liquid permeable sheet is a sheet obtained by making paper with pulp fiber containing black pulp fiber which is stained black.

It is preferable that a particle diameter of the charcoal is 0.01 mm to 1.0 mm.

It is preferable that basis weight of the top side liquid permeable sheet is 8 g/m² to 50 g/m² and air permeability of the top side liquid permeable sheet is 0.01 kPa·s/m to 0.25 kPa·s/m.

It is preferable that the absorbent layer has an absorbent core including hydrophilic fiber; and that the charcoal and the organic acid are disposed on a top sheet side face of the absorbent core.

It is preferable that the organic acid is citric acid.

It is preferable that the absorbent layer further includes a highly absorbent resin disposed on the top sheet side face of the absorbent core.

Another aspect of the present invention relates to a manufacturing method of a pet pad having a liquid permeable top sheet, a liquid impermeable back sheet, an absorbent layer containing charcoal and organic acid, the absorbent layer being disposed between the top sheet and the back sheet, and a black top side liquid permeable sheet that is disposed on a top sheet side of the absorbent layer. The method includes: a core forming step of forming an absorbent core including hydrophilic fiber; a scattering step of scattering a mixture of charcoal, organic acid and a highly absorbent resin onto one face of the absorbent core; and a top side liquid permeable sheet disposing step of disposing the top side liquid permeable sheet on a face of the absorbent layer on which the charcoal, the organic acid and the highly absorbent resin have been applied.

It is preferable that the manufacturing method further includes, between the scattering step and the top side liquid permeable sheet disposing step, a spraying step of spraying water onto the face of the absorbent layer on which the charcoal, the organic acid and the highly absorbent resin have been applied.

Effects of the Invention

The present invention can provide a pet pad that is configured to include charcoal and is superior in appearance and deodorizing property, and a manufacturing method of the pet pad.

PREFERRED MODE FOR CARRYING OUT THE INVENTION

A preferred embodiment of the pet pad according to the present invention will be described hereinafter with reference to the drawings. As illustrated in FIGS. 1 to 4, the pet pad 1 according to the present embodiment is a sheet having a rectangular shape in plan view, and is used mainly as a toilet for pets such as dogs and cats kept indoors. The pet pad 1 includes a top sheet 10, a back sheet 20, and an absorbent body 30 disposed between the top sheet 10 and the back sheet 20.

The top sheet 10 is configured of liquid permeable nonwoven fabric or a pored film. As the nonwoven fabric configuring the top sheet 10, spun bond nonwoven fabric made of thermoplastic long fiber; air-through nonwoven fabric made of thermoplastic short fiber; point bonded nonwoven fabric; or pored film can be exemplified.

Figure 1:
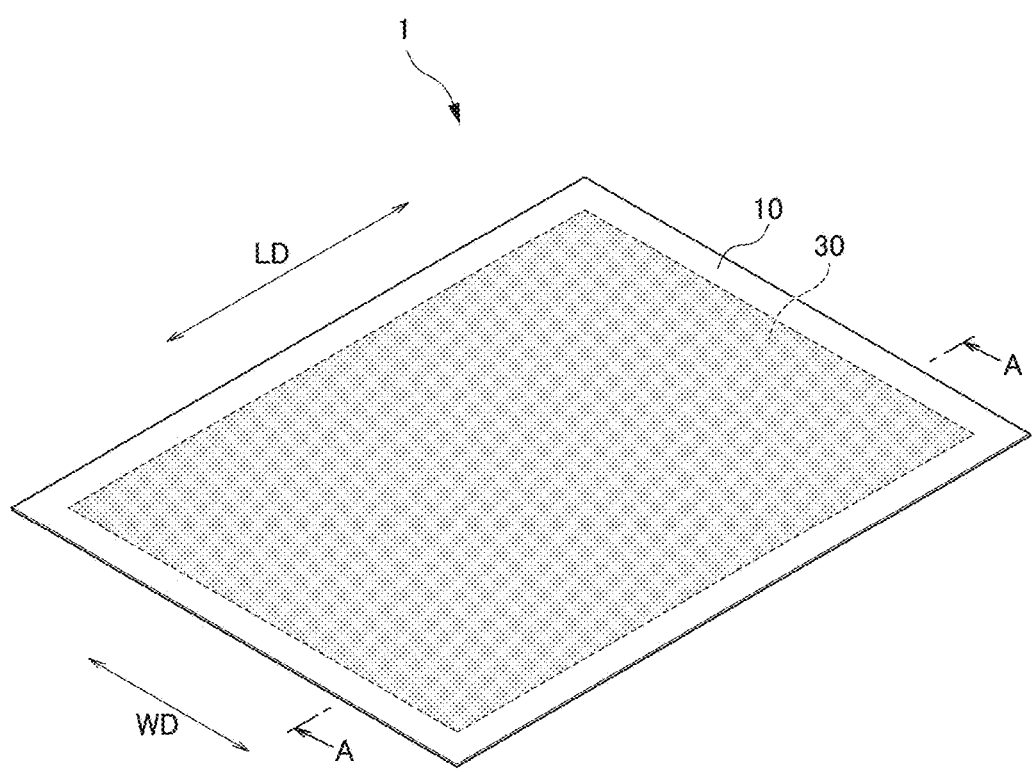
FIG. 1 is a perspective view illustrating a pet pad according to an embodiment of the present invention.
Figure 2:
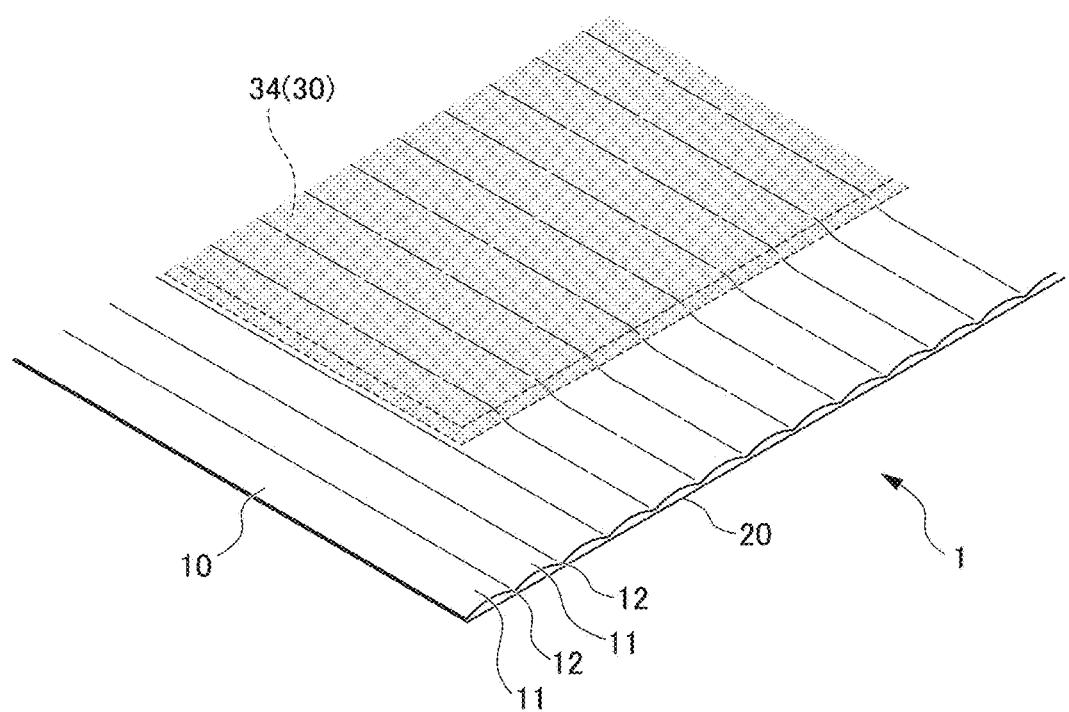
FIG. 2 is a partial enlarged view of FIG. 1.

In the present embodiment, the top sheet 10 is configured of air-through nonwoven fabric on which rib portions 11 and groove portions 12 are alternately formed as illustrated in FIG. 2.

In the case of configuring the top sheet 10 of nonwoven fabric, the basis weight thereof is preferably 10 g/m² to 80 g/m², and more preferably 10 g/m² to 50 g/m², from the viewpoint of preferably letting through liquid such as pet's urine.

The back sheet 20 is a substantially liquid impermeable sheet, which is formed in the same shape and same size as the top sheet 10. The back sheet 20 is configured of a liquid impermeable film, or nonwoven fabric having been subjected to a water-repellent treatment. As the film configuring the back sheet 20, a resin film such as a polyethylene film, a polypropylene film, a polyethylene terephthalate film, etc. can be exemplified.

In the present embodiment, the back sheet 20 is configured of a polyethylene film.

The absorbent body 30 is formed in a rectangular shape slightly smaller than the top sheet 10 and the back sheet 20 in plan view, and is arranged to be interposed between the top sheet 10 and the back sheet 20.

Figure 3:
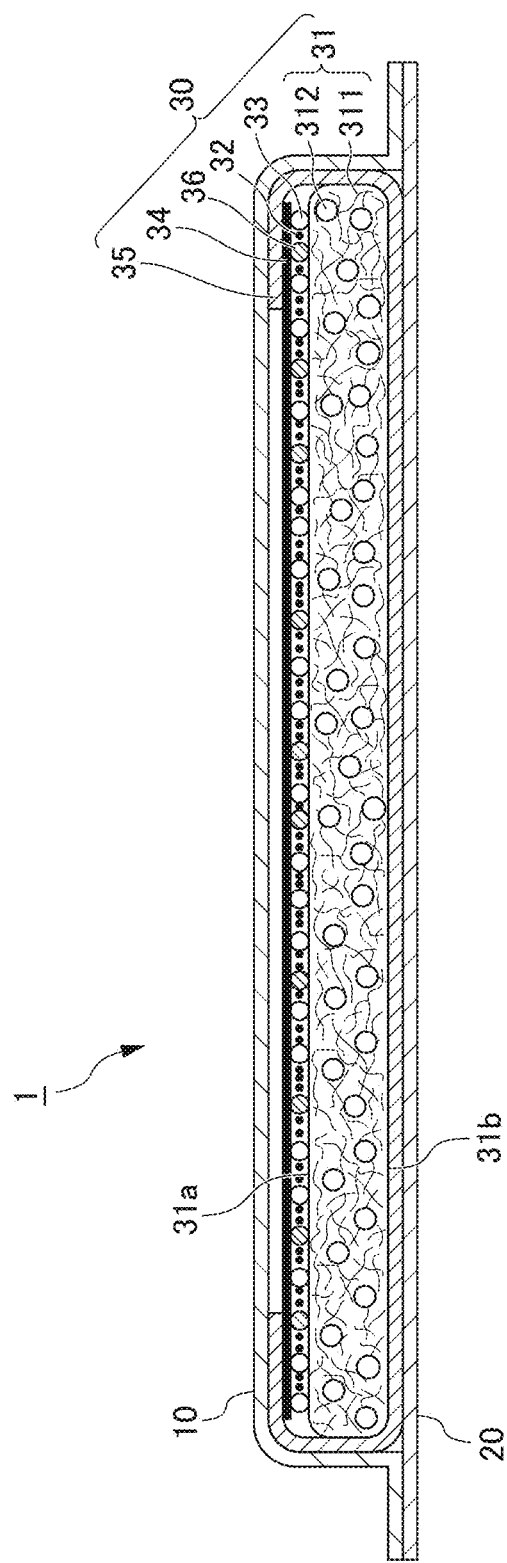
FIG. 3 is a cross-sectional view taken along a line A-A of FIG. 1.
Figure 4:
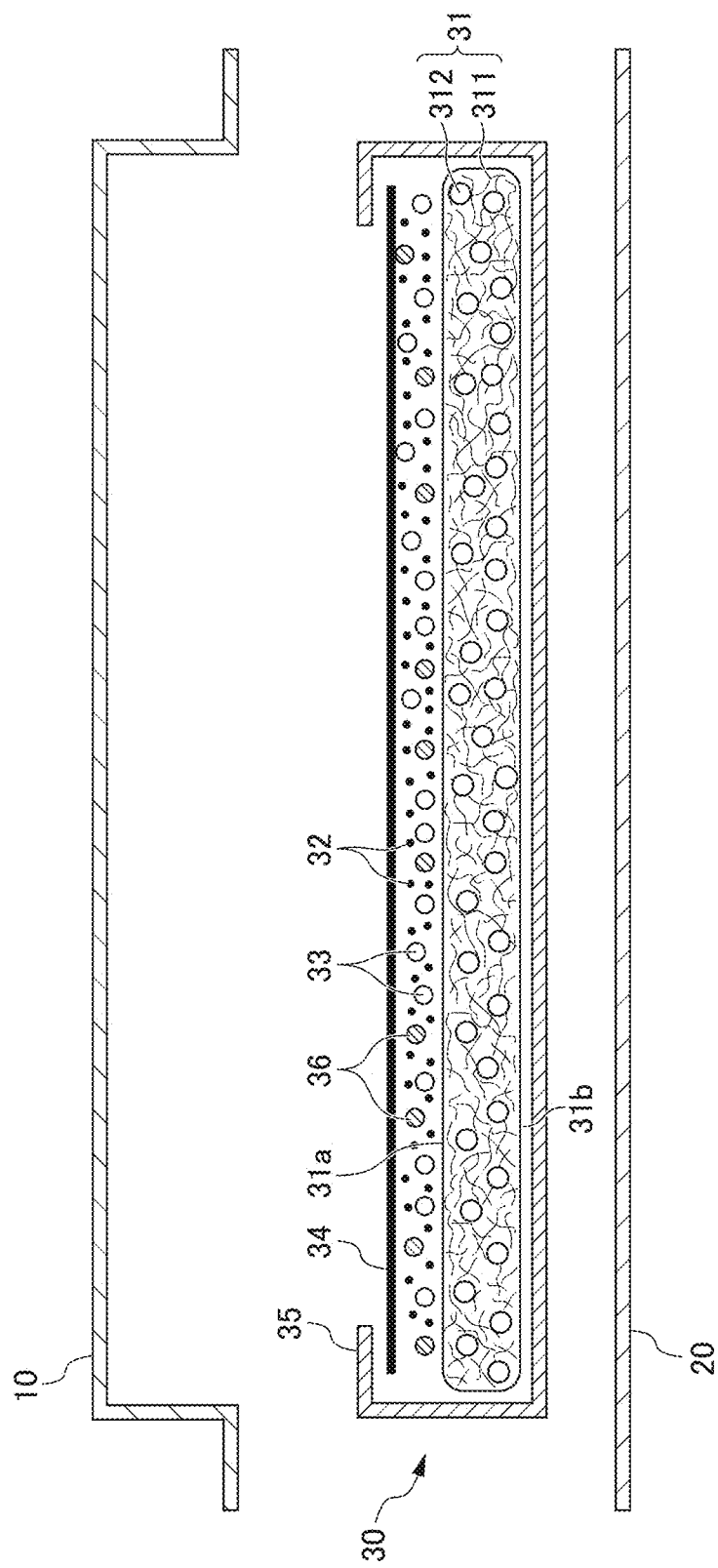
FIG. 4 is an exploded view illustrating members constituting the pet pad of FIG. 3.

The absorbent body 30 includes, as illustrated in FIGS. 3 and 4: a sheet-shaped absorbent core 31; charcoal 32, organic acid 36 and highly absorbent resin 33 that are disposed on a first face 31a of the absorbent core 31; black tissue 34 as a black top side liquid permeable sheet that is disposed to cover the first face 31a of the absorbent core 31; and a back side liquid permeable sheet 35 that covers mainly a second face 31b of the absorbent core 31.

The absorbent core 31 is configured to include a hydrophilic fiber 311 and a highly absorbent resin 312. It is preferable that the highly absorbent resin 312 is scattered so as to be dispersed substantially uniformly in a layer formed of the hydrophilic fiber 311.

As the hydrophilic fiber 311, known hydrophilic materials are used. More specifically, a cellulosic fiber, for example pulp such as fluffed pulp, regenerated pulp, wood powder, etc. can be used.

As the highly absorbent resin 312, a high-polymer absorbent body is used. More specifically, a resin which is superior in absorption property, such as polyacrylic polymer, starch-acrylic acid polymer, etc. can be used. The grain size of the highly absorbent resin 312 is preferably 0.01 mm to 0.5 mm.

The charcoal 32, the organic acid 36 and the highly absorbent resin 33, respectively as granular matters, are disposed on the first face 31a of the absorbent core 31. In the present embodiment, the charcoal 32, the organic acid 36 and the highly absorbent resin 33 are disposed in a mixed state and in a scattered manner on the first face 31a of the absorbent core 31. More particularly, the charcoal 32, the organic acid 36 and the highly absorbent resin 33 are disposed in a scattered manner in a region other than a peripheral part of the first face 31a of the absorbent core 31. In other words, a region in which the charcoal 32, the organic acid 36 and the highly absorbent resin 33 are disposed is slightly smaller than an area of the first face 31a of the absorbent core 31.

As the charcoal 32, for example, charcoal, coal, or activated charcoal pulverized into a predetermined grain size can be used. The grain size of the charcoal 32 is preferably 0.01 mm to 1.0 mm, more preferably 0.02 mm to 0.5 mm.

The grain size of the charcoal 32 being at least 0.01 mm can prevent the charcoal 32 from falling out of the absorbent body 30. Meanwhile, the grain size of the charcoal 32 being no greater than 1.0 mm can alleviate a foreign object sensation given to the pet standing on the pet pad 1.

A material such as citric acid, gluconic acid, succinic acid, lactic acid, fumaric acid and DL-malic acid, which can ensure safety when added to food, is preferably used for the organic acid 36. Further, from the viewpoint to enhancing the alkali neutralization effect (namely, the deodorizing effect on ammonia, etc.) of the organic acid 36, a material having two carboxyl groups such as gluconic acid, succinic acid, fumaric acid and DL-malic acid is preferably used for the organic acid 36. The grain size of the organic acid 36 is preferably 0.05 mm to 1.0 mm.

As the highly absorbent resin 33, the same substance as the highly absorbent resin 312 included in the absorbent core 31 can be used. The grain size of the highly absorbent resin 33 is preferably greater than the grain size of the charcoal 32 and smaller than the grain size of the highly absorbent resin 312. Use of the highly absorbent resin 33 having a grain size smaller than the highly absorbent resin 312 can inhibit gel-blocking from occurring due to the presence of the highly absorbent resin 33, in the surface of the absorbent core 31. More specifically, the grain size of the highly absorbent resin 33 is preferably 0.05 mm to 1.0 mm, more preferably 0.1 mm to 0.8 mm.

The amount of the charcoal 32 to be scattered onto the first face 31a of the absorbent core 31 is preferably 0.01 g/m² to 50 g/m², and more preferably 0.03 g/m² to 30 g/m². The amount of the organic acid 36 to be scattered onto the first face 31a is preferably 0.05 g/m² to 15 g/m², and more preferably 1 g/m² to 10 g/m², from the viewpoint of preferably attaining a deodorizing effect of the pet pad 1. Meanwhile, the amount of the highly absorbent resin 33 to be scattered onto the first face 31a is preferably 1 g/m² to 100 g/m², and more preferably 5 g/m² to 80 g/m² from the viewpoint of preferably retaining the charcoal 32 on a surface of the absorbent core 31 and maintaining superior absorbent property of the absorbent body 30.

The black tissue 34 as the top side liquid permeable sheet covers substantially the entire face of the first face 31a of the absorbent core 31. In other words, the black tissue 34 has a rectangular shape which is the same as the absorbent core 31, or slightly smaller than the absorbent core 31.

In the present embodiment, the black tissue 34 consists of tissue configured by making paper with pulp fiber containing black pulp fiber which is stained in black with a black dye or pigment. The black tissue 34 preferably has an L* value in the L*a*b* color system of no greater than 50, from the viewpoint of preferably masking the color of the charcoal 32 disposed on the first face 31a of the absorbent core 31. In addition, the black tissue 34 preferably has thickness of 0.01 mm to 0.5 mm and basis weight of 8 g/m² to 50 g/m², from the viewpoint of securing liquid permeability of the black tissue 34 and maintaining a superior effect of masking the charcoal 32.

A proportion of the black pulp fiber in the whole pulp fiber composing the black tissue 34 is preferably at least 20% by mass, and more preferably at least 50% by mass, from the viewpoint of maintaining a preferable black color of the black tissue 34.

Air permeability of the black tissue 34 is preferably 0.01 kPa·s to 0.25 kPa·s/m, from the same viewpoint.

The air permeability can be measured by using an air permeability tester (model name: KES-F8, manufactured by Kato Tech Co., Ltd.).

The back side liquid permeable sheet 35 is formed in a rectangular shape larger than the absorbent core 31 in plan view. The back side liquid permeable sheet 35 covers the entire second face 31b of the absorbent core 31, while a pair of side edges along a longitudinal direction LD are folded back to the first face 31a. In addition, the pair of side edges of the back side liquid permeable sheet 35 thus overlaps with an outer side of the black tissue 34 on the first face 31a of the absorbent core 31.

The back side liquid permeable sheet 35 is made of tissue configured mainly of pulp fiber.

In the present embodiment, sheet materials other than the black tissue 34 (top sheet 10, back sheet 20, absorbent core 31, back side liquid permeable sheet 35) are not subjected to coloring with a dye or pigment. In other words, the sheet materials other than the black tissue 34 have white to whitish colors. In addition, in the present embodiment, the absorbent layer is configured of the absorbent core 31, the charcoal 32, the highly absorbent resin 33, and the back side liquid permeable sheet 35. The absorbent body 30 is configured of the absorbent layer and the black tissue 34 disposed on the first face 31a side of the absorbent core 31 in the absorbent layer.

The above described pet pad 1 is configured by joining an outer peripheral part of the top sheet 10 to an outer peripheral part of the back sheet 20 by a hotmelt adhesive, in a state in which the absorbent body 30 is interposed between the top sheet 10 and the back sheet 20 as illustrated in FIGS. 3 and 4. Here, the absorbent body 30 is arranged such that a face on which the black tissue 34 is disposed is oriented to the top sheet 10. In other words, the first face 31a of the absorbent core 31, on which the charcoal 32, the organic acid 36 and the highly absorbent resin 33 are disposed, is disposed on the top sheet 10 side.

In the pet pad 1 of the present embodiment, the charcoal 32 is disposed on a top sheet 10-side-face of the absorbent core 31, and the black tissue is disposed between the absorbent core 31 and the top sheet. As a result, the color of the charcoal 32 disposed on the surface of the absorbent core 31 is covered by the black tissue 34, and this can prevent the presence of the charcoal 32 from being visually recognized from the top sheet 10 side when the pet pad 1 is viewed from the top sheet 10 side. Even in the case of the absorbent body 30 being configured to include the charcoal 32, deterioration of appearance of the pet pad 1 due to inclusion of the charcoal 32 can thus be prevented.

Further, the organic acid 36 together with the charcoal 32 are disposed on the surface sheet 10 side face of the absorbent core 31. As a result, the deodorizing effect of the pet pad 1 can be further improved. Namely, since the pet pad 1 includes the organic acid 36, the organic acid 36 neutralizes alkaline components such as ammonia deriving from urine excreted onto the pet pad 1, thereby achieving the deodorizing effect. Moreover, it is considered that the organic acid 36 neutralizes the ammonia physically adsorbed to the charcoal 32, thereby restoring the ammonia adsorption capacity of the charcoal 32. Further, it could also be possible that an alkaline component may be contained during the process of forming the charcoal 32; however, even if the charcoal 32 contains an alkaline component in this manner, since the organic acid 36 can neutralize such an alkaline component, the deodorizing effect on ammonia deriving from urine will not be reduced.

In addition, by employing the black tissue 34 as the top side liquid permeable sheet disposed on the first face 31a of the absorbent core 31, the color of the charcoal 32 can be more effectively masked. Although the top sheet may be made black, the top sheet is low in density with respect to basis weight, for obtaining superior texture. Given this, making the top sheet black cannot provide a sufficient masking effect.

A mode of the manufacturing method of the pet pad 1 of the present embodiment is described hereinafter with reference to FIGS. 5 and 6.

Figure 5:
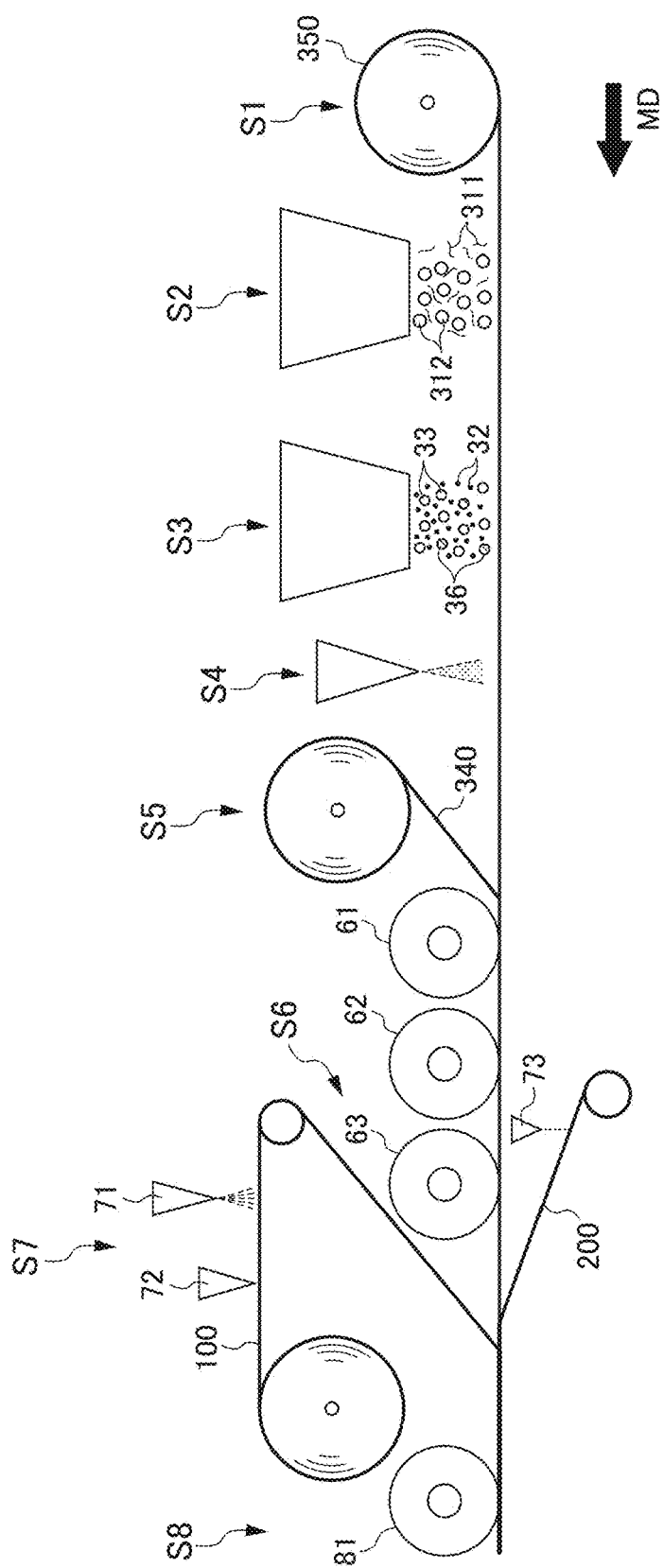
FIG. 5 is a diagram schematically illustrating an embodiment of a manufacturing method of a pet pad of the present invention.
Figure 6:
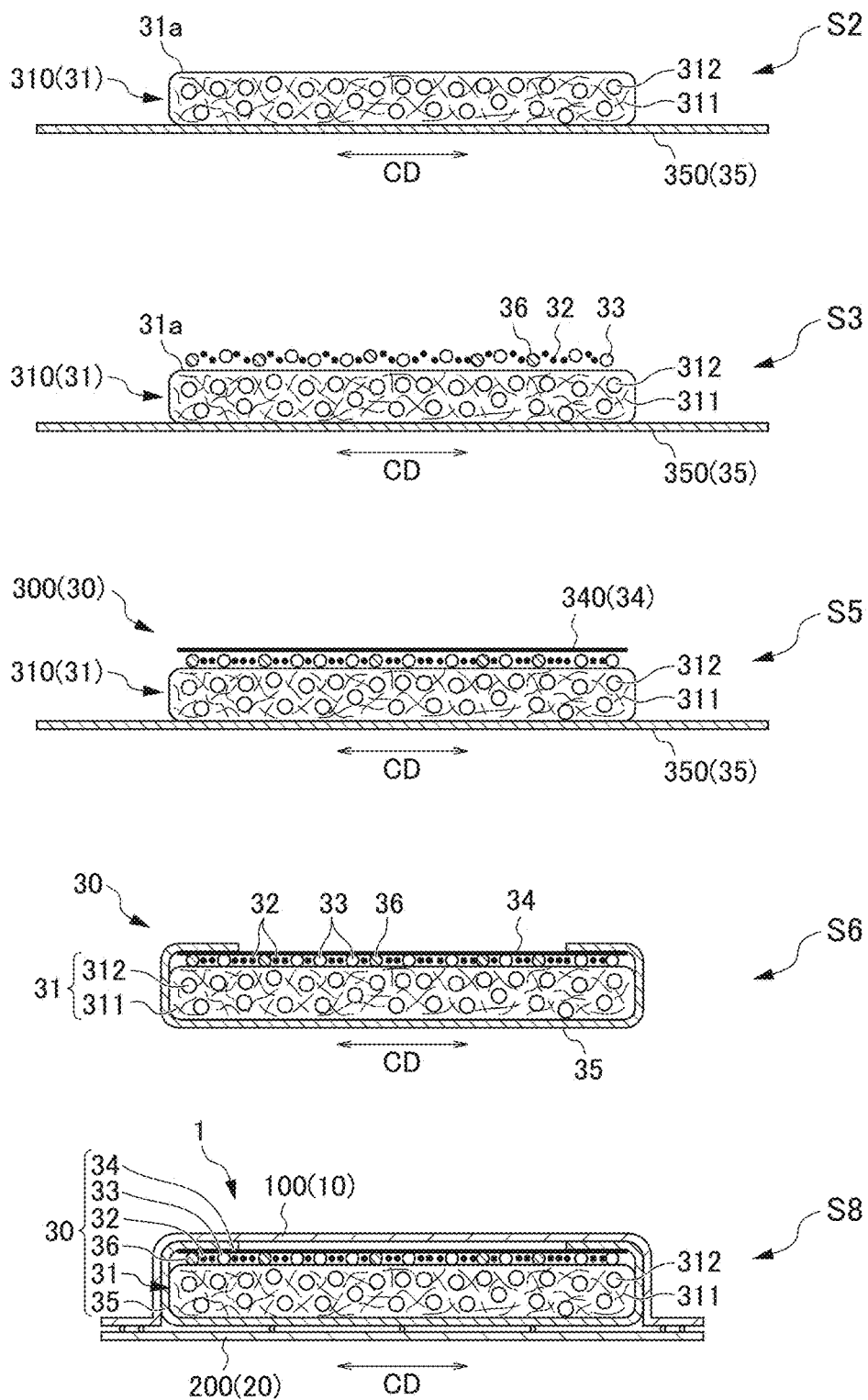
FIG. 6 shows cross-sectional views of the pet pad in respective steps of FIG. 5.

The manufacturing method of the pet pad 1 of the present mode comprises: a back side liquid permeable sheet unreeling step S1; a core forming step S2; a scattering step S3; a spraying step S4; a top side liquid permeable sheet disposing step S5; an absorbent body cutting step S6; an interposing step S7; and a product cutting step S8, as illustrated in FIG. 5.

In the back side liquid permeable sheet unreeling step S1, a belt-shaped continuous body 350 of the back side liquid permeable sheet is unreeled in a flow direction MD of a pet pad manufacturing machine.

In the core forming step S2, a mixture of the hydrophilic fiber (pulp) 311 and the highly absorbent resin 312 is scattered onto a first face (upper face) of the continuous body 350 of the back side liquid permeable sheet so as to have a predetermined basis weight, to thereby form a continuous body 310 of the absorbent core. In the core forming step S2, the mixture of the pulp 311 and the highly absorbent resin 312 is scattered in a width smaller than a width of the continuous body 350 of the back side liquid permeable sheet in a width direction CD (direction orthogonal to the flow direction MD) (refer to FIG. 6).

In the scattering step S3, a mixture of the charcoal 32, the organic acid 36 and the highly absorbent resin 33 is scattered onto a first face 31a (upper face) of the continuous body 310 of the absorbent core formed in the core forming step S2. As a result, the charcoal 32, the organic acid 36 and the highly absorbent resin 33 are disposed in a scattered manner on the first face 31a of the continuous body 310 of the absorbent core.

A continuous body of the absorbent layer is thus formed as a result of the core forming step S2 and the scattering step S3 described above.

In the spraying step S4, water is sprayed onto the first face 31a of the continuous body 310 of the absorbent core, on which the charcoal 32, the organic acid 36 and the highly absorbent resin 33 have been disposed. An adhesive force of the damp highly absorbent resin 33 bonds the charcoal 32, which has been disposed on the first face 31a of the continuous body 310 of the absorbent core, onto a surface of the absorbent core 31, to thereby prevent loss of the charcoal 32 from the absorbent core 31. An amount of water to be sprayed in the spraying step S4 is preferably 0.5 g/m$^2$ to 5 g/m$^2$. If the amount of water to be sprayed is less than 0.5 g/m$^2$, the charcoal 32 may not sufficiently bond onto the surface of the absorbent core 31. If the amount of water to be sprayed is greater than 5 g/m$^2$, the charcoal 32 may rinse off from the surface of the absorbent core 31.

In the top side liquid permeable sheet disposing step S5, the continuous body 340 of the black tissue is unreeled and then layered onto the first face 31a (upper face) of the continuous body 310 of the absorbent core onto which water has been sprayed in the spraying step S4. A continuous body 300 of the absorbent body is thus produced.

In the absorbent body cutting step S6, the continuous body 300 of the absorbent body is cut at predetermined intervals in the flow direction MD to thereby produce the absorbent body 30. More specifically, in the absorbent body cutting step S6, a roll press means 61, an embossing press means 62, and an absorbent body cutter 63 are provided.

And then, after folding back both end portions in the width direction CD of the continuous body 350 of the back side liquid permeable sheet toward an upper face side, the continuous body 300 of the absorbent body is pressed by means of the roll press means 61 and the embossing press means 62 in a thickness direction, and cut at predetermined intervals.

In the interposing step S7, a continuous body 100 of the top sheet is unreeled from an upper face side of the absorbent body 30 while a continuous body 200 of the back sheet is unreeled from a lower face side of the absorbent body 30, and the absorbent body 30 is thus interposed between the continuous body 100 of the top sheet and the continuous body 200 of the back sheet. More specifically, in the interposing step S7, a curtain hotmelt application device 71, an intermittent hotmelt application device 72, and a back sheet side hotmelt application device 73 are provided. To an inner face side (side of a face oriented to the absorbent body 30) of the continuous body 100 of the top sheet, the hotmelt adhesive is sprayed as mist from the curtain hotmelt application device 71 while the hotmelt adhesive is applied by the intermittent hotmelt application device 72 at predetermined intervals in the flow direction MD. Meanwhile, to an inner face side of the continuous body 200 of the back sheet, the hotmelt adhesive is applied by the back sheet side hotmelt application device 73 at predetermined intervals in a width direction of the back sheet.

As a result, the continuous body 100 of the top sheet is joined with the upper face of the absorbent body 30 by means of the hotmelt adhesive being sprayed as mist so as not to inhibit liquid permeability, while the continuous body 200 of the back sheet is joined with the lower face of the absorbent body 30 by means of the hotmelt adhesive applied by the back sheet side hotmelt application device 73. In addition, the continuous body of the top sheet is joined with the continuous body of the back sheet, in regions where the absorbent body 30 is not arranged. A continuous body of the pet pad is thus produced.

In the product cutting step S8, the continuous body of the pet pad is cut at predetermined intervals to thereby obtain the pet pad 1. More specifically, in the product cutting step S8, a product cutter 81 is provided and the product cutter 81 cuts the continuous body of the pet pad.

The above described pet pad 1 and the manufacturing method of the pet pad 1 according to the present embodiment provide the following operation and effects.

(1) In the case of configuring the absorbent body 30 to include the charcoal 32, the black charcoal 32 is disposed in a scattered manner among white to whitish colored pulp, which is a major component of the absorbent body 30. As a result, when the pet pad 1 is seen from the top sheet 10 side, numerous black regions in a spotted pattern caused by the charcoal 32 are visually perceived. In order to address this problem, the pet pad 1 (absorbent body 30) is configured to include the absorbent layer containing the charcoal 32, the organic acid 36 and the black tissue 34 disposed on the top sheet 10 side of the absorbent layer. As a result, since the absorbent body 30 includes the charcoal and the organic acid 36, the deodorizing property of the pet pad 1 can be improved. Furthermore, by disposing the black tissue 34 on the top sheet 10 side of the absorbent layer, the charcoal 32 having been disposed in a scattered manner on the first face 31a of the absorbent core 31 can be covered by the black tissue 34. Deterioration of appearance of the pet pad 1 due to inclusion of the charcoal 32 can thus be prevented. Moreover, since the color of the black tissue 34 can be visually recognized through the top sheet 10, an image of charcoal can be suggested to a user of the pet pad 1 (owner of the pet) and a visual effect of giving an impression of superior deodorizing properties can be provided.

(2) The black tissue 34 is configured of a sheet obtained by making paper with pulp fiber which is stained black. This can provide the pet pad 1 which has superior appearance, without impairing liquid permeability to the absorbent core 31.

(3) The absorbent body 30 is configured to include the absorbent core 31 containing the pulp 311 and the highly absorbent resin 312, and the charcoal 32 is disposed on the top sheet 10 side face (first face 31a) of the absorbent core 31. The charcoal 32 can thus be disposed more to the top sheet 10 side than the absorbent core 31, and an effect of suppressing odor of the liquid such as urine having been absorbed by the absorbent core 31 can be improved.

(4) The charcoal 32, the organic acid 36 and the highly absorbent resin 33 are disposed on the first face 31a of the absorbent core 31. An adhesive force of the highly absorbent resin 33 bonds the charcoal 32 onto a surface of the absorbent core 31, to thereby prevent loss of the charcoal 32 from the absorbent core 31.

(5) The manufacturing method of the pet pad 1 is configured to include the core forming step S2 of forming the absorbent core 31, and the scattering step S3 of scattering the mixture of the charcoal 32, the organic acid 36 and the highly absorbent resin 33 on the first face 31 a of the absorbent core 31. This can attach the charcoal 32 onto the surface of the highly absorbent resin 33, and/or attach the highly absorbent resin 33 onto the surface of the charcoal 32 by an electrostatic force. Displacement of the charcoal 32 in the absorbent body 30 can thus be limited, and reduction in visual recognizability and in deodorizing performance due to disproportionate black regions can be prevented. In addition, amounts of the charcoal 32 and/or the highly absorbent resin 33 lost from the pulp fibers configuring the black tissue 34 to the top sheet 10 side can be reduced. As a result, the charcoal 32 and/or the highly absorbent resin 33 that have/has been lost can be prevented from adhering to the pet and from dirtying the vicinities of the pet pad 1, and reduction in deodorizing performance and absorbing performance of the pet pad 1 can be prevented. Furthermore, this allows effective manufacture of the absorbent core 31 with the charcoal 32, the organic acid 36 and the highly absorbent resin 33 being disposed on the top sheet 10 side face.

(6) The manufacturing method of the pet pad 1 is configured to include the spraying step S4 of spraying water onto a face of the absorbent layer on which the charcoal 32, the organic acid 36 and the highly absorbent resin 33 are disposed. As a result, an adhesive force of the damp highly absorbent resin 33 bonds the charcoal 32, which has been disposed on the first face of the absorbent layer, onto a surface of the absorbent layer, to thereby prevent loss of the charcoal 32 from the absorbent layer.

A preferred embodiment and a mode of the present invention have been explained heretofore; however, the present invention is not limited thereto and can be modified appropriately.

For example, although in the present embodiment the charcoal 32 and the organic acid 36 are disposed on the first face 31a of the absorbent core 31, the present invention is not limited thereto. The absorbent core can also be configured to include the charcoal and the organic acid 36.

In addition, although in the present embodiment the absorbent body 30 is configured of the absorbent layer and the black tissue 34 disposed on the top sheet 10 side face of the absorbent layer, the present invention is not limited thereto. The absorbent body can also be configured without the black tissue, and a black liquid permeable sheet can be disposed between the absorbent body and the top sheet. In other words, a so-called intermediate sheet, which is disposed between the absorbent body and the top sheet, can be configured of the black liquid permeable sheet.

EXAMPLES

Next, the present invention is described in further detail based on Examples; however, the present invention is not limited thereto.

Examples 1 and 2, and Comparative Example

By use of the above-mentioned manufacturing method, a pet pad of Example 1, in which 0.09 g/m² of charcoal, 1.80 g/m² of citric acid, and 19.00 g/m² of highly absorbent resin are scattered on the surface sheet side face of the absorbent core, a pet pad of Example 2, in which 0.09 g/m² of charcoal, 3.60 g/m² of citric acid, and 19.00 g/m² of highly absorbent resin are scattered on the surface sheet side face of the absorbent core, and a pet pad of Comparative Example, in which 0.09 g/m² of charcoal, 0.00 g/m² of citric acid, and 19.00 g/m² of highly absorbent resin are scattered on the surface sheet side face of the absorbent core, in which citric acid is not disposed, were manufactured; and the deodorizing effect of these pet pads was evaluated. Note that the size of the pet pads used was 44 cm in length and 32 cm in width (the size of the absorber layers of the pet pads was 40 cm in length and 28 cm in width).

The deodorizing effect was evaluated with the following procedure.

Each one of the pet pads of the Examples and Comparative Example, with the absorbent surface (surface sheet) up, was stored into a gas sampling bag of 20 l in capacity (product name: Tedlar Bag (registered trademark), made by AS ONE Corporation). Next, 40 ml of 0.1% by mass/volume ammonia aqueous solution was dropped onto the center of the pet pad, and the bag was subsequently filled with odor-free air.

In addition, an ammonia concentration inside the gas sampling bag was measured twice with a detecting tube (ammonia gas detecting tube Type 3M, made by GASTEC Corporation), immediately after dripping the ammonia aqueous solution, and two hours thereafter. The results are shown in Table 1.

TABLE 1

|  | Time elapsed | |
| --- | --- | --- |
|  | Immediately after dropping | 2 hours thereafter |
| Example 1 | 5.0 | 1.0 |
| Example 2 | 6.0 | 1.0 |
| Comparative Example | 13 | 5.0 |

Unit: ppm

As shown in Table 1, it has been revealed that the deodorizing effect on ammonia is improved in the pet pads of Examples 1 and 2 containing charcoal and citric acid, as compared to the pet pad of the Comparative Example containing charcoal without containing citric acid. Further, it has been revealed that the pet pad of Example 1 containing 1.8 g/m² of citric acid, and the pet pad of Example 2 containing 3.6 g/m² of citric acid, both achieve an excellent deodorizing effect on ammonia.

EXPLANATION OF REFERENCE NUMERALS

1 Pet pad
10 Top sheet
20 Back sheet
30 Absorbent body
31 Absorbent core
32 Charcoal
33 Highly absorbent resin
34 Black tissue (Top side liquid permeable sheet)
36 Organic acid
311 Hydrophilic fiber
312 Highly absorbent resin
S2 Core forming step
S3 Scattering step
S4 Spraying step
S5 Top side liquid permeable sheet disposing step

The invention claimed is:

1. A pet pad comprising:
a liquid permeable top sheet;
a liquid impermeable back sheet;
an absorbent layer containing charcoal and organic acid, the absorbent layer being disposed between the top sheet and the back sheet; and
a black top side liquid permeable sheet that is disposed on a top sheet side of the absorbent layer.

2. The pet pad according to claim 1, wherein
the top side liquid permeable sheet is a sheet obtained by making paper with pulp fiber containing black pulp fiber which is stained black.

3. The pet pad according to claim 1, wherein
a particle diameter of the charcoal is 0.01 mm to 1.0 mm.

4. The pet pad according to claim 1, wherein
basis weight of the top side liquid permeable sheet is 8 g/m² to 50 g/m² and air permeability of the top side liquid permeable sheet is 0.01 kPa·s/m to 0.25 kPa·s/m.

5. The pet pad according to claim 1, wherein
the absorbent layer has an absorbent core including hydrophilic fiber; and
the charcoal and the organic acid are disposed on a top sheet side face of the absorbent core.

6. The pet pad according to claim 5, wherein
the absorbent layer further includes a highly absorbent resin disposed on the top sheet side face of the absorbent core.

7. The pet pad according to claim 1, wherein
the organic acid is citric acid.

8. A manufacturing method of a pet pad having a liquid permeable top sheet, a liquid impermeable back sheet, an absorbent layer containing charcoal and organic acid, the absorbent layer being disposed between the top sheet and the back sheet, and a black top side liquid permeable sheet that is disposed on a top sheet side of the absorbent layer, the method comprising:
a core forming step of forming an absorbent core including hydrophilic fiber;
a scattering step of scattering a mixture of charcoal, organic acid and a highly absorbent resin onto one face of the absorbent core; and
a top side liquid permeable sheet disposing step of disposing the top side liquid permeable sheet on a face of the absorbent layer on which the charcoal, the organic acid and the highly absorbent resin have been applied.

9. The manufacturing method of a pet pad according to claim 8, further comprising, between the scattering step and the top side liquid permeable sheet disposing step, a spraying step of spraying water onto the face of the absorbent layer on which the charcoal, the organic acid and the highly absorbent resin have been applied.

\* \* \* \* \*